US010762006B2

(12) United States Patent
Pihlman et al.

(10) Patent No.: US 10,762,006 B2
(45) Date of Patent: Sep. 1, 2020

(54) TECHNIQUES TO DYNAMICALLY ENABLE MEMORY CHANNELS ON A COMPUTE PLATFORM

(71) Applicant: INTEL CORPORATION, Santa Clara, CA (US)

(72) Inventors: Jeffrey A. Pihlman, Steilacoom, WA (US); Ramamurthy Krithivas, Chandler, AZ (US)

(73) Assignee: INTEL CORPORATION, Santa Clara, CA (US)

( * ) Notice: Subject to any disclaimer, the term of this patent is extended or adjusted under 35 U.S.C. 154(b) by 622 days.

(21) Appl. No.: 15/476,901

(22) Filed: Mar. 31, 2017

(65) Prior Publication Data
US 2018/0285289 A1 Oct. 4, 2018

(51) Int. Cl.
G06F 13/16 (2006.01)
G06F 9/44 (2018.01)
G06F 9/4401 (2018.01)

(52) U.S. Cl.
CPC ........ G06F 13/1668 (2013.01); G06F 9/4401 (2013.01)

(58) Field of Classification Search
None
See application file for complete search history.

(56) References Cited

U.S. PATENT DOCUMENTS

| 5,621,678 A * | 4/1997 | Barnaby | G06F 13/1694 |
| | | | 365/52 |
| 2004/0117581 A1* | 6/2004 | Lee | G06F 13/1684 |
| | | | 711/170 |
| 2005/0102568 A1* | 5/2005 | Billick | G06F 11/267 |
| | | | 714/25 |
| 2006/0074952 A1* | 4/2006 | Rothman | G06F 9/4451 |
| 2008/0320254 A1* | 12/2008 | Wingard | G06F 12/0607 |
| | | | 711/157 |
| 2010/0293410 A1* | 11/2010 | Bland | G11C 29/08 |
| | | | 714/6.13 |
| 2010/0296256 A1* | 11/2010 | Gillingham | G06F 13/1684 |
| | | | 361/729 |
| 2011/0161672 A1* | 6/2011 | Martinez | G06F 21/57 |
| | | | 713/176 |
| 2012/0159238 A1* | 6/2012 | Wang | G06F 11/1417 |
| | | | 714/6.1 |
| 2014/0164717 A1* | 6/2014 | Seroff | G06F 3/0611 |
| | | | 711/148 |
| 2015/0012623 A1* | 1/2015 | Jubran | H04L 41/0866 |
| | | | 709/220 |

FOREIGN PATENT DOCUMENTS

WO  WO-2016159935 A1 * 10/2016 ......... G06F 9/44505

* cited by examiner

Primary Examiner — Kaushikkumar M Patel

(57) ABSTRACT

Various embodiments are generally directed to an apparatus, method and other techniques to determine one or more memory channels of a plurality of memory channels to be enabled based on an indication received from a basic input/output system (BIOS), determine whether a number of the one or more memory channels to be enabled is greater than a maximum number of memory channels permitted, cause a platform reset if the number of the one or more memory channels is greater than the maximum number of memory channels, and permit enablement of the one or more memory channels if the number of the one or more memory channels is not greater than the maximum number of memory channels.

22 Claims, 10 Drawing Sheets

PROCESSOR DEVICE
220B

400

DETERMINE ONE OR MORE MEMORY CHANNELS OF A PLURALITY OF MEMORY CHANNELS TO BE ENABLED BASED ON AN INDICATION RECEIVED FROM A BASIC INPUT/OUTPUT SYSTEM (BIOS)
405

DETERMINE A NUMBER OF THE ONE OR MORE MEMORY CHANNELS TO BE ENABLED IS GREATER THAN A MAXIMUM NUMBER OF MEMORY CHANNELS PERMITTED
410

CAUSE A PLATFORM RESET IF THE NUMBER OF THE ONE OR MORE MEMORY CHANNELS IS GREATER THAN THE MAXIMUM NUMBER OF MEMORY CHANNELS
415

PERMIT ENABLEMENT OF THE ONE OR MORE MEMORY CHANNELS IF THE NUMBER OF THE ONE OR MORE MEMORY CHANNELS IS NOT GREATER THAN THE MAXIMUM NUMBER OF MEMORY CHANNELS
420

*FIG. 4*

TECHNIQUES TO DYNAMICALLY ENABLE MEMORY CHANNELS ON A COMPUTE PLATFORM

TECHNICAL FIELD

Embodiments described herein generally include determining memory channels to enable in a compute platform and enabling the memory channels.

BACKGROUND

To meet increasing performance demands in a compute environment there is a trend to increase the number of processing cores and memory bandwidth for processor components. Typically, as the number of processing cores and memory bandwidth increase so does the number of memory channels. However, different users may require different performance demands. Thus, a one size fits all approach is cost prohibitive and does not work. Current solutions statically configure memory channels and core counts based on price and performance. However, statically configuring limits original equipment manufacturers flexibility and can lead to divergent designs. Thus, embodiments discussed herein solve these and other problems to provide a more flexible approach for compute systems.

BRIEF DESCRIPTION OF THE DRAWINGS

Embodiments of the invention are illustrated by way of example, and not by way of limitation, in the figures of the accompanying drawings in which like reference numerals refer to similar elements.

FIG. 4 illustrates an example of a processing flow.

DETAILED DESCRIPTION

Figure 1:
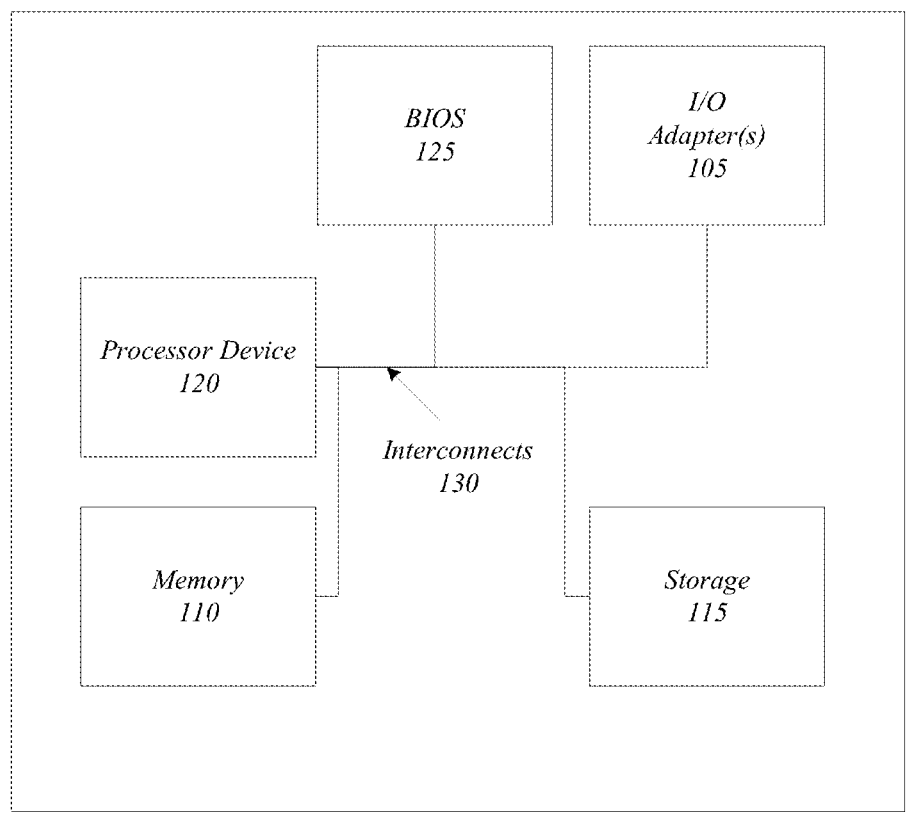
FIG. 1 illustrates an example of compute system.

Various embodiments may be generally directed to custom configuring and dynamically enabling memory channels in a compute environment. How many memory channels and which memory channels are to be enabled may be determined by a user, a customer, a board manufacturer, etc. and set via one or more configurable settings in a basic input/output system (BIOS). Embodiments also include enforcing memory channel count compliance, such that the number of memory channels to be enabled does not exceed the number of permitted memory channels to be enabled for a processor device, e.g. computer process unit (CPU) or system on chip (SoC).

More specifically, embodiments include determining one or more memory channels of a plurality of memory channels to be enabled based on an indication received from a basic input/output system (BIOS). For example, a power control unit (PCU) may receive a mailbox command from the BIOS, which includes one or more bits set in a PCU register. The one or more bits set may indicate the number of and which memory channels are to be enabled (or disabled) for a system. Moreover, each memory channel may have a corresponding bit in the PCU register, that when set, indicates that the corresponding memory channel is to be enabled. In some embodiments, the opposite logic may be utilized such that a bit set may indicate that the corresponding memory channel is to be disabled. Embodiments are not limited in this manner.

Embodiments also include determining whether a number of the one or more memory channels to be enabled is greater than a maximum number of memory channels permitted at block 410. More specifically, the PCU may determine the maximum number of memory channels permitted based on an indication in a capability identification (CapID) register. The PCU may perform a comparison to determine whether the number of memory channels to be enabled is greater than the maximum number of memory channels permitted. In some embodiments, the PCU may perform the determination with opposite logic, e.g. the PCU may determine whether the number of memory channels to be enabled is less than (or equal) to the maximum number of memory channels permitted.

Based on the determination, embodiments include causing a platform reset if the number of the one or more memory channels is greater than the maximum number of memory channels. For example, the PCU may issue a machine-check exception (MCE) to cause a compute system to reset. In some embodiments, the PCU may cause an indication to be presented on a display indicating that the number of memory channels attempting to be enabled is greater than the maximum number of memory channels permitted to be enabled for a processor device. Further, embodiments also include permitting enablement of the one or more memory channels if the number of the one or more memory channels is not greater than the maximum number of memory channels. For example, the PCU may provide an indication to the BIOS that it may complete the boot process. These and other details will become more apparent in the following description.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives consistent with the claimed subject matter.

FIG. 1 illustrates an example embodiment of a compute system 100. In various embodiments, system 100 may be representative of a system or architecture suitable for use with one or more embodiments described herein. However, the embodiments are not limited in this respect.

As shown in FIG. 1, system 100 may include multiple elements connected via one or more interconnects 130. One or more elements may be implemented using circuits, components, registers, processors, software subroutines, modules, or any combination thereof, as desired for a given set of design or performance constraints. Further, the one or more interconnects 130 may be any type of interconnect including, but not limited to, one or more buses, control lines, data lines, and traces. Example of the interconnects 130 may operate in accordance with one or more standards, such as the Quick Path Interconnect Ver. 1.1 standard or any predecessors, revisions, or variants thereof, Peripheral Component Interconnect (PCI) Ver. 2.2 standard or any predecessors, revisions, or variants thereof, PCI Express (PCIe) interconnect standard revision 3.1a or any predecessors, revisions, or variants thereof, HyperTransport standard version 3.1 or any predecessors, revisions, or variants thereof, System Management Bus (SMBus) standard version 3 or any predecessors, revisions, or variants thereof, Direct Media Interface (DMI) standard version 3.0 or any predecessors, revisions, or variants thereof. Embodiments are not limited to these examples.

Although FIG. 1 shows a limited number of elements in a certain topology by way of example, it can be appreciated that more or fewer elements in any suitable topology may be used in system 100 as desired for a given implementation. The embodiments are not limited in this context. Moreover, compute system 100 may be any type of computer or processing device including a personal computer, desktop computer, tablet computer, netbook computer, notebook computer, laptop computer, server, server farm, blade server, or any other type of server, and so forth.

In various embodiments, compute system 100 may include a processor device 120. The processor device 120 may be one or more of any type of computational element, such as but not limited to, a computer processor unit (CPU), a microprocessor, a processor, central processing unit, digital signal processing unit, dual core processor, multi-core processor, mobile device processor, desktop processor, single core processor, a system-on-chip (SoC) device, complex instruction set computing (CISC) microprocessor, a reduced instruction set (RISC) microprocessor, a very long instruction word (VLIW) microprocessor, or any other type of processor or processing circuit on a single chip or integrated circuit. As will be discussed in more detail below, the processor device 120 may include a number of elements on-die such as one or more cores, a power control unit (PCU), one or more registers, cache, one or more integrated memory controllers, a graphics processor, display controller, one or more input/output (I/O) controllers, and other elements such as a clock, execution unit, and so forth. The processor device 120 may be connected to and communicate with the other elements of the computing system 100 via one or more interconnects 130.

In embodiments, the processor device 120 may be coupled with one or more I/O adapters 105. Examples of I/O adapters 105 may include Universal Serial Bus (USB) ports/adapters, IEEE 1394 Firewire ports/adapters, and so forth. The embodiments are not limited in this context. The I/O adapters 105 may couple with one or more other devices.

In embodiments, the processor device 120 may be coupled with storage 115. Storage 115 may be implemented as a non-volatile storage device such as, but not limited to, a magnetic disk drive, optical disk drive, tape drive, an internal storage device, an attached storage device, flash memory, and/or a network accessible storage device. In embodiments, storage 115 may include technology to increase the storage performance enhanced protection for valuable digital media when multiple hard drives are included, for example. Further examples of storage 115 may include a hard disk, magnetic media, magneto-optical media, removable memory cards or disks, or the like. The embodiments are not limited in this context.

In embodiments, the compute system 100 may include memory 110 coupled with the processor device 120. Memory 110 may be coupled with the processor device 120 via the one or more interconnects 130, or by a dedicated memory bus between processor device 120 and the memory 110, as desired for a given implementation.

The memory 110 may be implemented using any machine-readable or computer-readable media capable of storing data, including both volatile and non-volatile memory. In some embodiments, the machine-readable or computer-readable medium may include a non-transitory medium. The embodiments are not limited in this context. In some embodiments, storage 115 may be volatile memory, e.g. dynamic random access memory (DRAM), double data rate (DDR) DRAM, synchronous dynamic random-access memory (SDRAM), DDR SDRAM, and so forth. Moreover, the memory 110 may be 3D XPoint memory, ferroelectric memory, silicon-oxide-nitride-oxide-silicon (SONOS) memory, polymer memory such as ferroelectric polymer memory, ferroelectric transistor random access memory (FeTRAM or FeRAM), nanowire, phase change memory, magnetoresistive random access memory (MRAM), spin transfer torque MRAM (STT-MRAM) memory, or the like.

In embodiments, processor device 120 may communicate with the memory 110 via one or more memory channels, which may include a multi-channel memory architecture. The one or more memory channels effectively increase the data rate between the processor device 120, and in particular, a memory controller and the memory 110 by approximately the number of channels. For example, in a dual-channel memory architecture, the data rate approximately doubles. In another example, in a quad-channel memory architecture the data rate approximately quadruples. In embodiments, each of the memory channels may be coupled with a corresponding dual in-line memory module (DIMM) slot capable of coupling with a memory module for the memory 110. As will be discussed in more detail, the memory channels may be enabled and disabled by a user configuration in a basic input/output system (BIOS) 125.

In embodiments, the BIOS 125 may be a system BIOS, a ROM BIOS, a PC BIOS, unified extensible firmware interface (UEFI), and so forth. The BIOS 125 may be firmware used to perform hardware initialization during a boot process for the compute system 100 and provide run-time services for operating systems and programs. The BIOS 125 may initialize hardware components including initialization of the memory 110. For example, as part of the memory initialization, the BIOS 125 may determine a number of memory channels to enable for the compute system 100, determine whether any memory modules/DIMMs have failed a memory test, and map the memory channels to memory. In previous systems, the number of memory channels to be enabled on a system was fixed and fused based on a stock keeping unit (SKU) for a processor device (CPU/SoC). However, in embodiments discussed herein, the number of memory channels enabled may be dynamically adjusted (between boot cycles) via a BIOS interface as long as the number does not exceed a maximum number of permitted memory channels for a processor device. The maximum number of memory channels may be indicated in a capability identification register, which can be read by the BIOS 125 and provided to a power control unit (PCU) to perform a verification. Embodiments include ensuring that the maximum number of memory channels permitted is not exceeded via a power control unit (PCU), for example.

Figure 2A:
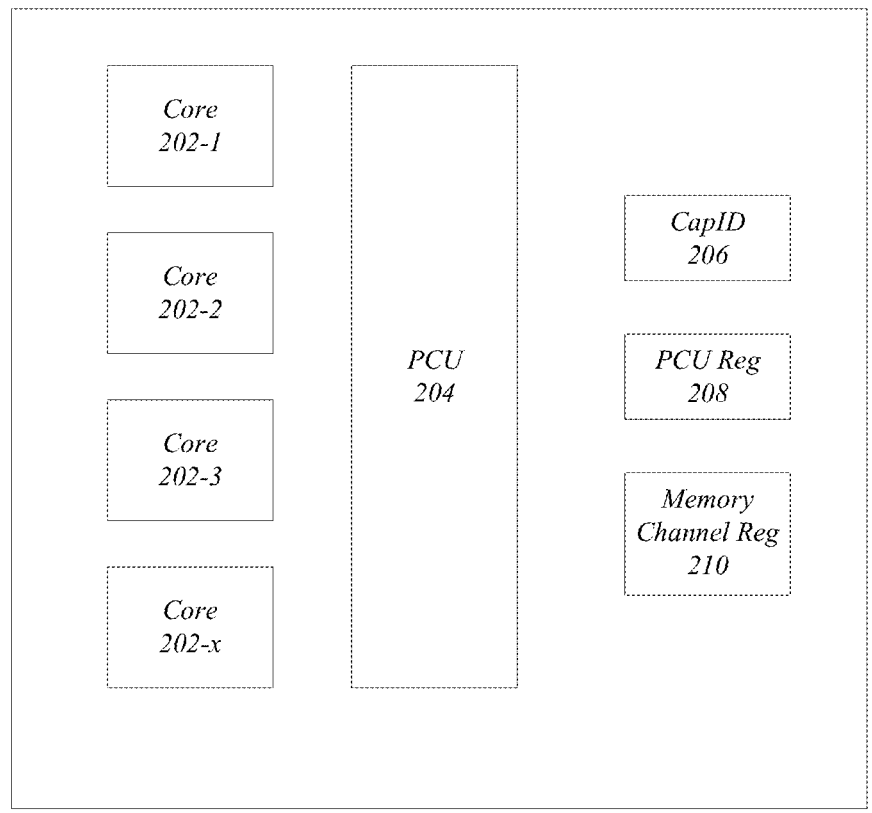
FIG. 2A illustrates an example of a processor component.

FIG. 2A illustrates an example embodiment of processor device 220A, which may be the same as or similar to processor device 120 of FIG. 1. The processor device 220A may include a number of elements, including one or more cores 202-1 through 202-x, where x may be any positive integer greater than zero, a power control unit (PCU) 204, and a number of registers, including a capability identification register 206, a PCU register 208, and a memory channel register 210. In embodiments, the processor device 220A is not limited to these elements, as they are illustrated based on their relevancy to the details discussed herein.

In embodiments, a core 202 may be an independent processing unit including circuitry capable of reading, decoding, and executing program instructions. The programming instructions are typical computing processing unit (CPU) instructions. Each of the cores 202 may be capable of operating and processing the program instructions in parallel, increasing the overall speed at which programming instructions are processed.

The processor device 220A also includes a power control unit (PCU), which may be a controller capable of executing instructions, which may be firmware stored in a memory. The PCU 204 may perform power management operations for the processing device 220A and a compute system, for example.

The PCU 204 may also perform verification and run-time monitoring of memory channels. For example, the PCU 204 may verify that a number of memory channels to be enabled is less than or equal to a maximum number of memory channels permitted for the processor device 220A. The PCU 204 may determine one or more memory channels to be enabled based on an indication received from a BIOS. The indication may result from a user setting or selection in the BIOS to enable particular memory channels for a compute system. The PCU 204 may receive the indication via a mailbox command set by the BIOS. More specifically, the BIOS may set one or more bits in a register, such as power control unit (PCU) register 208. The one or more bits may be a bit map such that each bit corresponds to a particular memory channel. Thus, setting a particular bit in the bit map indicates that the corresponding memory channel is to be enabled. The bit map indicates the number of memory channels to be enabled and which memory channels are to be enabled based on the correspondence with the memory channel. In some instances, the bit map of the PCU register 208 may indicate the opposite logic. In other words, setting a bit in the bit map may indicate that a corresponding memory channel is to be disabled. Embodiments are not limited in this manner.

The PCU 204 will utilize the number of channels enabled by BIOS to verify that the number of the one or more memory channels to be enabled is less than or equal to (not greater than) a maximum number of memory channels permitted. The PCU 204 may receive an indication that the BIOS has brought the memory subsystem out of reset via a mailbox command, e.g. setting one or more bits in the PCU register 208 which may be different bits than the bit map. The PCU 204 may compare the number of memory channels enabled by the BIOS with the maximum number of permitted memory channels for a processor device. The maximum number of permitted memory channels may be based on an SKU for a processor device, for example. Further, an indication of the maximum number of permitted memory channels may be stored in a capability identification (CapID) register 206, which may be a "DDR MC Channel Allowed" register. The PCU 204 may access the CapID register 206 to determine the maximum number of permitted memory channels. This CapID register 206 may be set at the time of manufacture and fused per SKU for a processor device.

Further, the PCU 204 may take one or more actions if the number of memory channels to be enabled is greater than (or less than/equal) to the number of permitted memory channels. For example, the PCU 204 may cause a platform reset if the number of memory channels is greater than the maximum number of memory channels permitted. The reset may be a machine check error or exception (MCE) and cause a compute system to perform a soft reset or reboot and require a different number of memory channels to be enabled via the BIOS, for example. Alternatively, the PCU 204 may permit the enablement of memory channels if the number to be enabled is not greater than the maximum number of memory channels permitted. Thus, a compute system may be permitted to complete the boot process and enter a normal operating state.

The PCU 204 may also perform real-time monitoring after the initial verification of the memory channels is complete and the memory is initialized. The real-time monitoring may detect a change or attempt to change a number of enabled memory channels after the memory channels were first initialized. For example, the PCU 204 may prevent changes to the number of memory channels enabled while a compute system is operating in a system management mode (SMM) of operation. The PCU 204 may utilize one or more hardware mechanisms to detect and prevent changes to a number of memory channels enabled during run-time.

In the embodiment illustrated in FIG. 2A, the PCU 204 may utilize the memory channel register 210, such as the memory controller channel enablement (MCMTR) register. More specifically, during the boot process, channel disable bits in the memory channel register 210, e.g. MCMTR.chn_disable, are set based on the memory channels enabled (disabled). These bits indicate the memory channels disabled (and enabled) during run-time operations of a compute system. The PCU 204 may lock the memory channel register 210 after the boot phase, e.g. upon completion of memory training boot phase and initialization, such that bits are read-only. In one example, the PCU 204 may set a policy option in an Intel© On-Chip System Fabric (IOSF) sideband interface to make the MCMTR.chn_disable read-only upon completion of memory training (MRC) boot phase. Thus, the memory channels enabled/disabled are set until a next boot cycle. Moreover, the PCU 204 may detect and prevent change attempts to enabled/disabled memory channels via the MCMTR register 210. In some instances, the PCU 204 may invoke an MCE if a change attempt is detected.

Figure 2B:
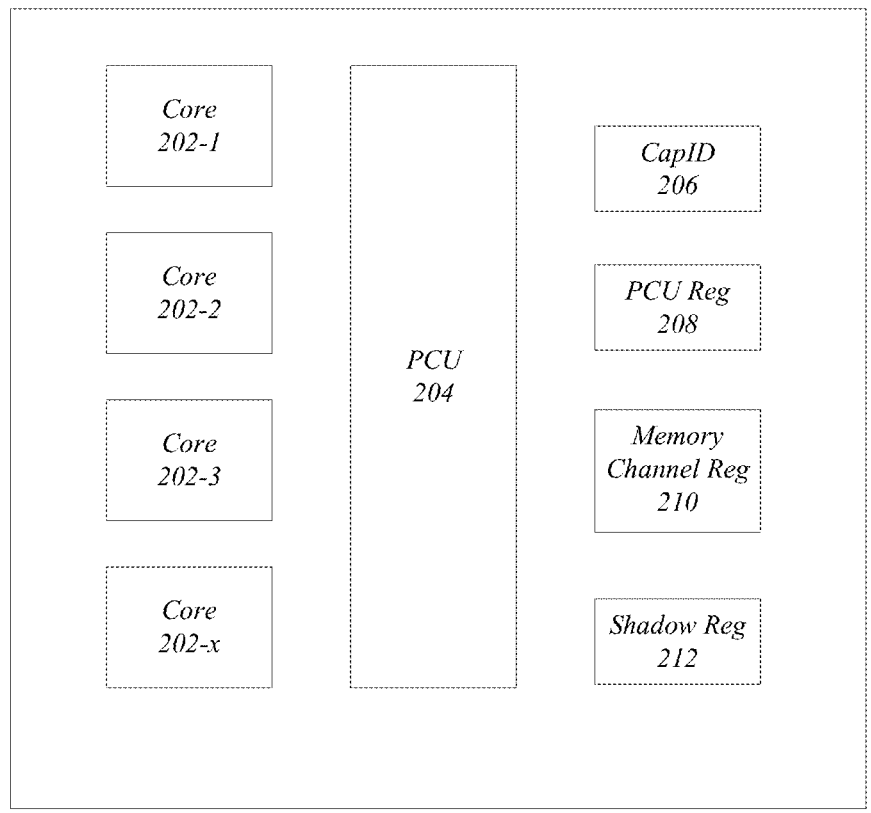
FIG. 2B illustrates an example of a processor component.

FIG. 2B illustrates another example of an embodiment of a processor device 220B where a different hardware mechanism is utilized to provide run-time enforcement of a memory channel allocation. In FIG. 2B, the PCU 204 may utilize a shadow register 212, such as the MC-uCR register to detect and prevent memory channel enablement changes during run-time. The PCU 204 may set the shadow register during the boot process and initialization of the memory with memory channels to be disabled (or enabled) using the bit map set in the PCU register 208 by the BIOS. The shadow register 212 may be a shadow register in that only the PCU 204 may access (read/write) to it. The BIOS and other software/hardware is prevented from making changes to the shadow register 212. Thus, the PCU 204 may use the shadow register 212 to detect any changes made to the memory channel allocation during run-time. More specifically, the PCU 204 may determine that the memory channels enabled (or disabled) in the memory channel register 210 matches the original configuration stored in the shadow register 212. If they are the same in both the memory channel register 210 and the shadow register 212, then no changes have been made to the memory channel allocation. However, if there are differences, a change attempt is detected and the PCU 204 may cause a corrective action, such as issuing an MCE to cause a reset. In some instances, the PCU 204 may permit the change in the memory channel if the number of memory channels does not exceed the maximum permitted number of memory channels.

Figure 3:
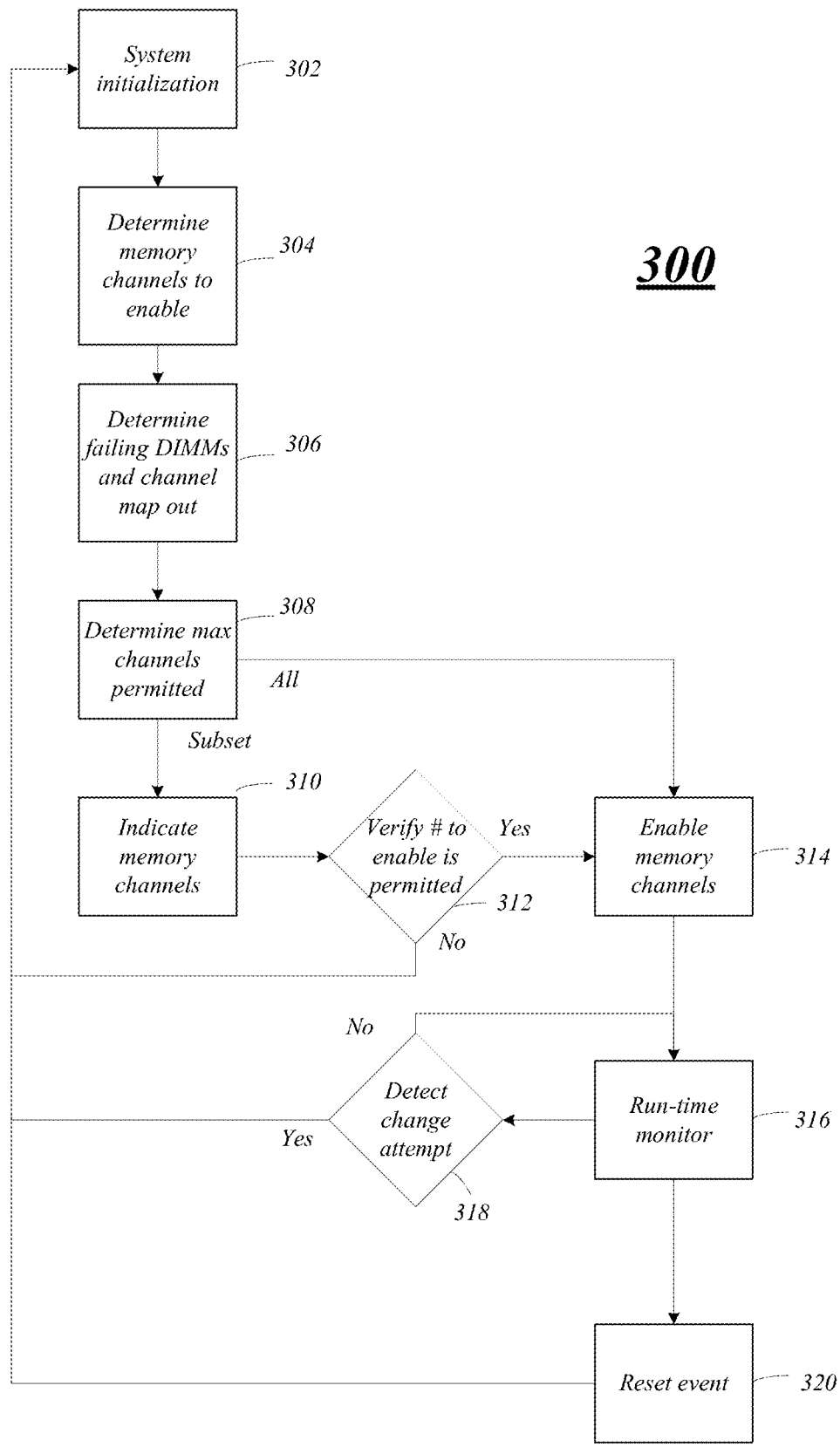
FIG. 3 illustrates an example of a logic flow.

FIG. 3 illustrates an embodiment of logic flow 300. The logic flow 300 may be representative of some or all of the operations executed by one or more embodiments described herein. For example, the logic flow 300 may illustrate operations performed by a compute system, such as compute system 100 including the processor device 120 and the BIOS 125.

In embodiments, the logic flow 300 includes detecting a system initialization at block 302. The system initialization may be invoked by a received power signal, which triggers a series of events to boot a compute system into a normal operating state. The series of events may be known as a boot sequence, which includes initialization and testing various hardware components of the compute system. As part of the boot sequence, the BIOS may initialize the memory and processing cores of the compute system, for example.

FIG. 3 illustrates one or more operations that may be performed by the BIOS and the PCU as part of a memory initialization. For example, the logic flow 300 includes determining a number of memory channels to enable for a compute system at block 304. In embodiments, the number of memory channels to enable may be based on a user input. For example, a user may be able to make a selection of a number of and which memory channels to enable for a compute system via an interface that may be presented on a display. In some embodiments, a compute system may determine which memory channels to enable or attempt to enable based on a detection of memory modules inserted in DIMM slots of the compute system. Further and at block 306, the logic flow 300 includes determining faulty DIMMs and mapping out memory channel allocations based on the detected faulty DIMMs.

At block 308, the logic flow 300 may include determining the maximum number of memory channels permitted to be enabled for a processor device. More specifically, the BIOS may read a capability identification register, such as a "DDR MC Channel Allowed," to determine the maximum memory channels that are permitted to be enabled for a particular processor device. If all of the memory channels capable for a compute system are permitted to be enabled for a particular processor device, the logic flow may include permitting the BIOS to enable the memory channels at block 314. However, if only a subset of the available memory channels are permitted to be enabled for a particular processor device, a power control unit of the processor device may perform a verification to ensure that the desired number of memory channels to be enabled does not exceed the maximum number of memory channels permitted at blocks 310 and 312.

At block 310, the logic flow includes indicating the memory channels to be enabled by setting one or more bits in a PCU register, e.g. communicating a mailbox command. More specifically, the BIOS may set the one or more bits, which may be a bit map indicating a number of memory channels to be enabled and which memory channels. In some embodiments, the logic of PCU register may indicate which memory channels are to be disabled. In other words, a bit set as a logical "1" may indicate that an associated memory channel is to be disabled, while a bit set as a logical "0" may indicate that an associated memory channel is to be enabled. In other embodiments, the opposite logic may be used. For example, a logical "1" may indicate an associated memory channel is to be enabled, and a logical "0" may indicate an associated memory channel is to be disabled. Embodiments are not limited in this manner.

The PCU may determine which memory channels are to be enabled via the PCU register, and at block 312, determine whether the number of memory channels to be enabled exceeds the number of permitted memory channels for a processor device. Note that the logic flow may include opposite, such that the PCU may determine whether the number of memory channels to be enabled is less than (or equal) to the number of permitted memory channels. Moreover, the PCU may determine the number of permitted memory channels for the processor device based on information in a capability identification register, such as the "DDR MC Channel Allowed" register. If the determination indicates that the number to be enabled exceeds the number of permitted memory channels for a particular processor device, the PCU may cause a reset by issuing an MCE. However, if the PCU determines the number of memory channels to be enabled does not exceed the permitted number of memory channels, the PCU may permit the BIOS to complete the enablement of the memory channels and finish the boot sequence.

During run-time of a compute system, e.g. when the compute system is operating in a typical fashion via an operating system, the PCU may perform real-time monitoring to detect any attempts to change the number of enabled memory channels at 316 and 318. If no attempts are detected, the PCU may continue to monitor a compute system and operations until the compute system is shut down or a reset occurs (reboot) at block 320. At block 318, if the PCU detects an attempt to change a number of memory channels enabled, the PCU may cause a reset by issuing an MCE, for example. Embodiments are not limited in this manner.

FIG. 4 illustrates an example of a second processing flow 400 to verify that the number of memory channels to be enabled does not exceed the maximum number of memory channels permitted for a processor device. The processing flow 400 may be representative of some or all of the operations executed by one or more embodiments described herein. For example, the processing flow 400 may illustrate operations performed in a compute system, and in particular, a PCU.

At block 405, the logic flow 400 may include determining one or more memory channels of a plurality of memory channels to be enabled based on an indication received from a basic input/output system (BIOS). More specifically, the PCU may receive a mailbox command from the BIOS, which includes one or more bits set in a PCU register. The one or more bits set may indicate the number of and which memory channels are to be enabled (or disabled). Moreover, each memory channel may have a corresponding bit in the PCU register, that when set, indicates that the memory channel is to be enabled. In some embodiments, the opposite logic may be utilized such that a bit set may indicate that the corresponding memory channel is to be disabled.

The logic flow 400 includes determining whether a number of the one or more memory channels to be enabled is greater than a maximum number of memory channels permitted at block 410. More specifically, the PCU may determine the maximum number of memory channels permitted based on an indication in a CapID register. The PCU may perform a comparison to determine whether the number of memory channels to be enabled is greater than the maximum number of memory channels permitted. In some embodiments, the PCU may perform the determination with opposite logic. The PCU may determine whether the number of memory channels to be enabled is less than (or equal to) the maximum number of memory channels permitted.

At block 415, the logic flow 400 includes causing a platform reset if the number of the one or more memory channels is greater than the maximum number of memory channels. For example, the PCU may issue an MCE to cause a compute system to reset. In some embodiments, the PCU may cause an indication to be presented on a display indicating that the number of memory channels attempting to be enabled is greater than the maximum number of memory channels permitted to be enabled for a processor device. At block 420, the logic flow 400 includes permitting enablement of the one or more memory channels if the number of the one or more memory channels is not greater than the maximum number of memory channels. For example, the PCU may provide an indication to the BIOS that it may complete the boot process.

Figure 5A:
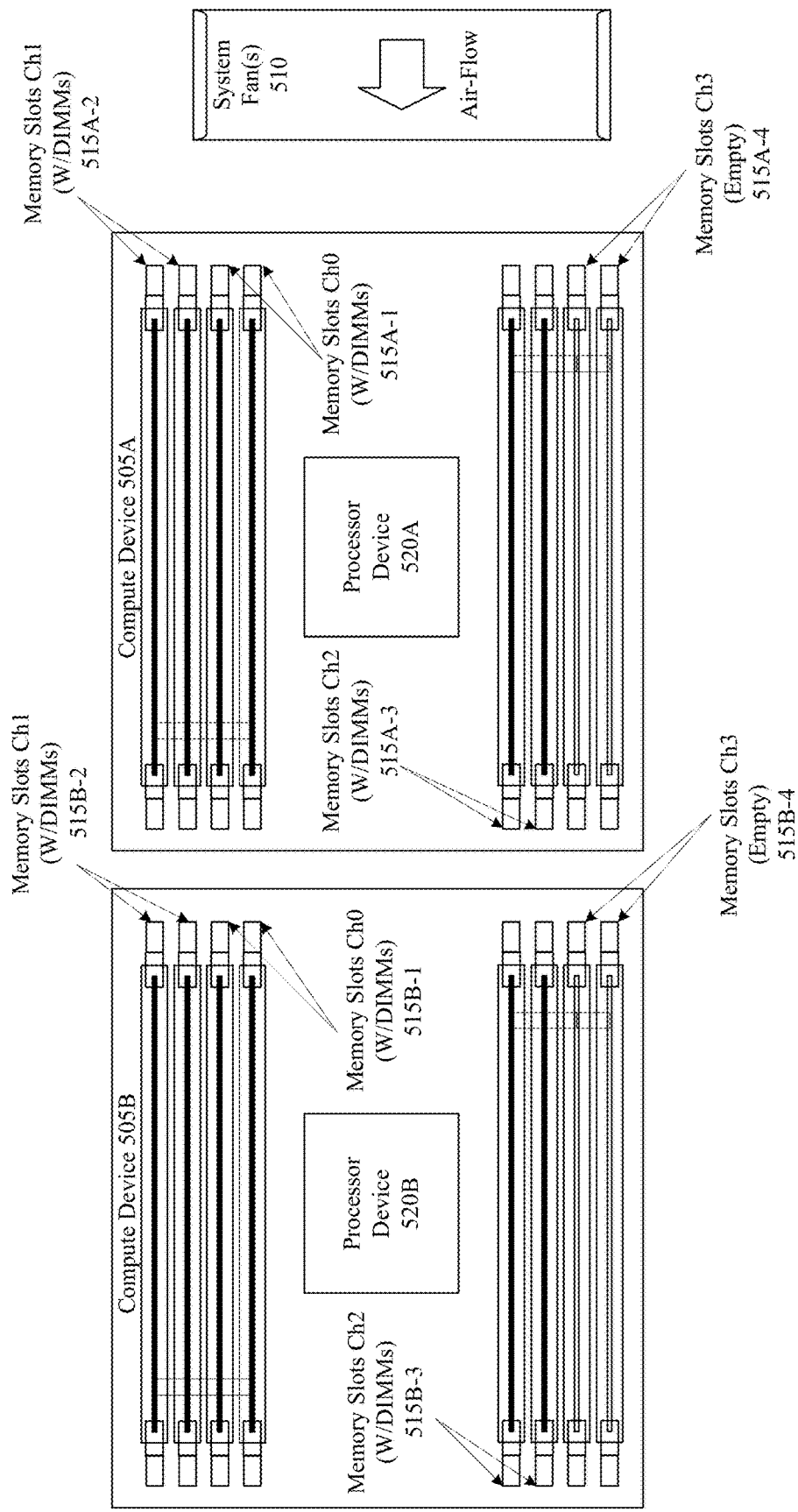
FIGS. 5A/5B illustrate examples airflow through a compute system.

FIGS. 5A/5B illustrate examples of airflow through a compute system 500 with different memory channel enablement configurations. FIG. 5A illustrates a typical memory channel configuration with memory on two separate compute devices 505A and 505B cooled by a system fan 510. In the illustrated example of FIG. 5A, each compute device 505A and 505B has three memory channels enabled. More specifically, compute device 505A has memory channels 0-2 associated with memory slots 515A-1 through 515A-3 enabled. Memory slots 515A-4 are empty, and memory channel three is disabled. Similarly, compute device 505B has memory channels 0-2 associated with memory slots 515B-1 through 515B-3 enabled. Memory slots 515B-4 are empty, and memory channel three is disabled.

Figure 5B:
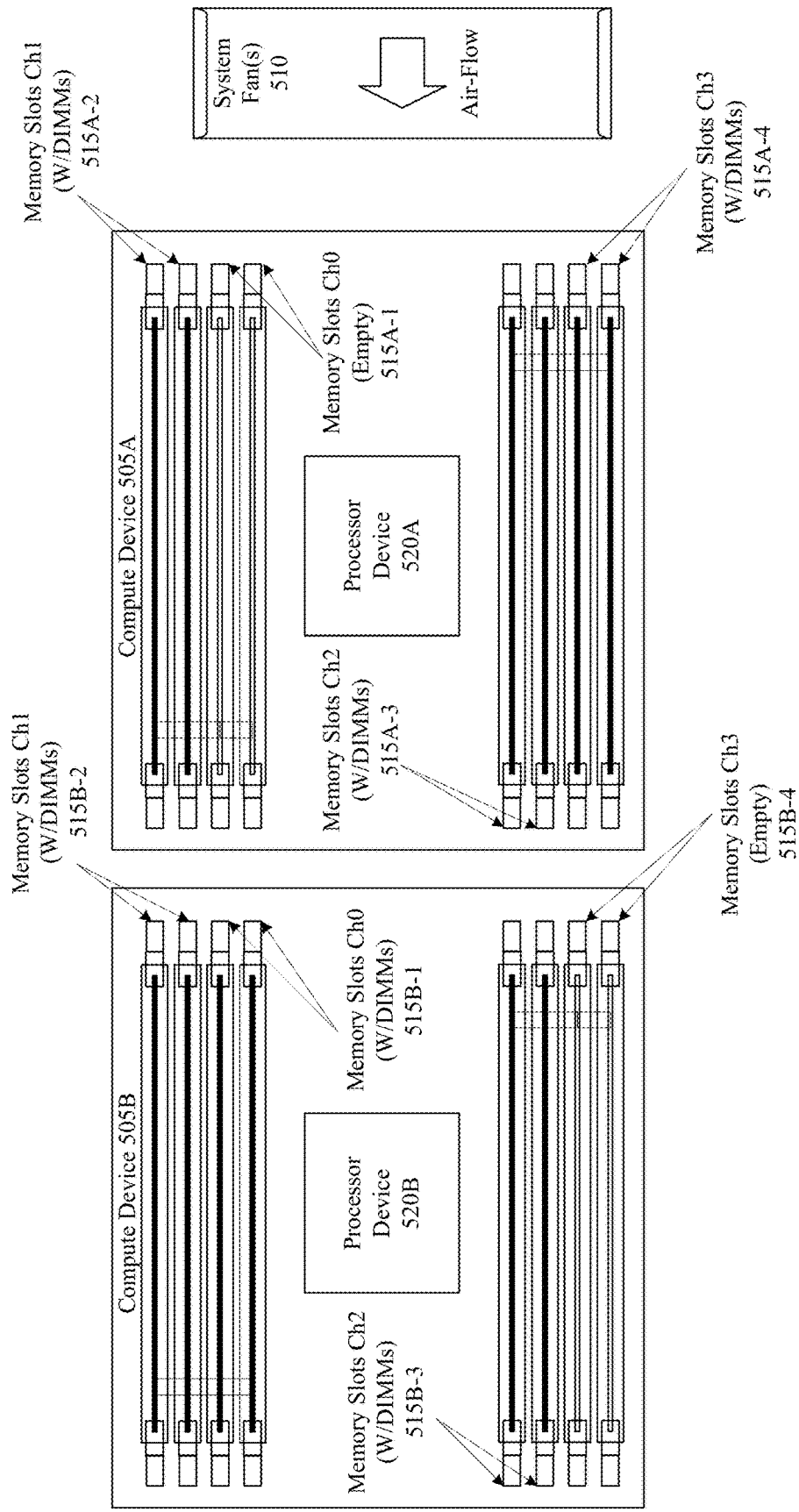

FIG. 5B illustrates an alternative example of airflow through the compute system 500 with different memory channels enabled than the memory channels enabled in the example in FIG. 5A. Embodiments discussed herein permit different memory channels on the compute devices 505A and 505B to be enabled. Thus, different memory slots may be utilized to optimize the cooling capabilities provided by the system fan 510.

In FIG. 5B, the compute device 505A has memory in memory slots 515A-2 through 515A-4 and memory slots 515A-1 are empty. The memory channels associated with memory slots 515A-2 through 515A-4 are enabled, and the memory channel (Ch0) associated with memory slots 515A-1 is disabled. Compute device 505B has a different configuration and airflow is optimized. Compute device 505B has memory in memory slots 515B-1 through 515B-3. Memory slot 515B-4 is empty, and the associated memory channel (Ch3) is disabled. In the illustrated example of FIG. 5B, the components (memory) of the downstream compute device 505B will receive less heat from the components (memory) of the upstream compute device 505A, optimizing the thermal performance. In FIG. 5A, the empty slot of the upstream compute device 505A is in front of the empty slot of the down compute device 505B. The benefit of having an empty slot in front of a component of the downstream compute device 505B is not realized.

Figure 6A:
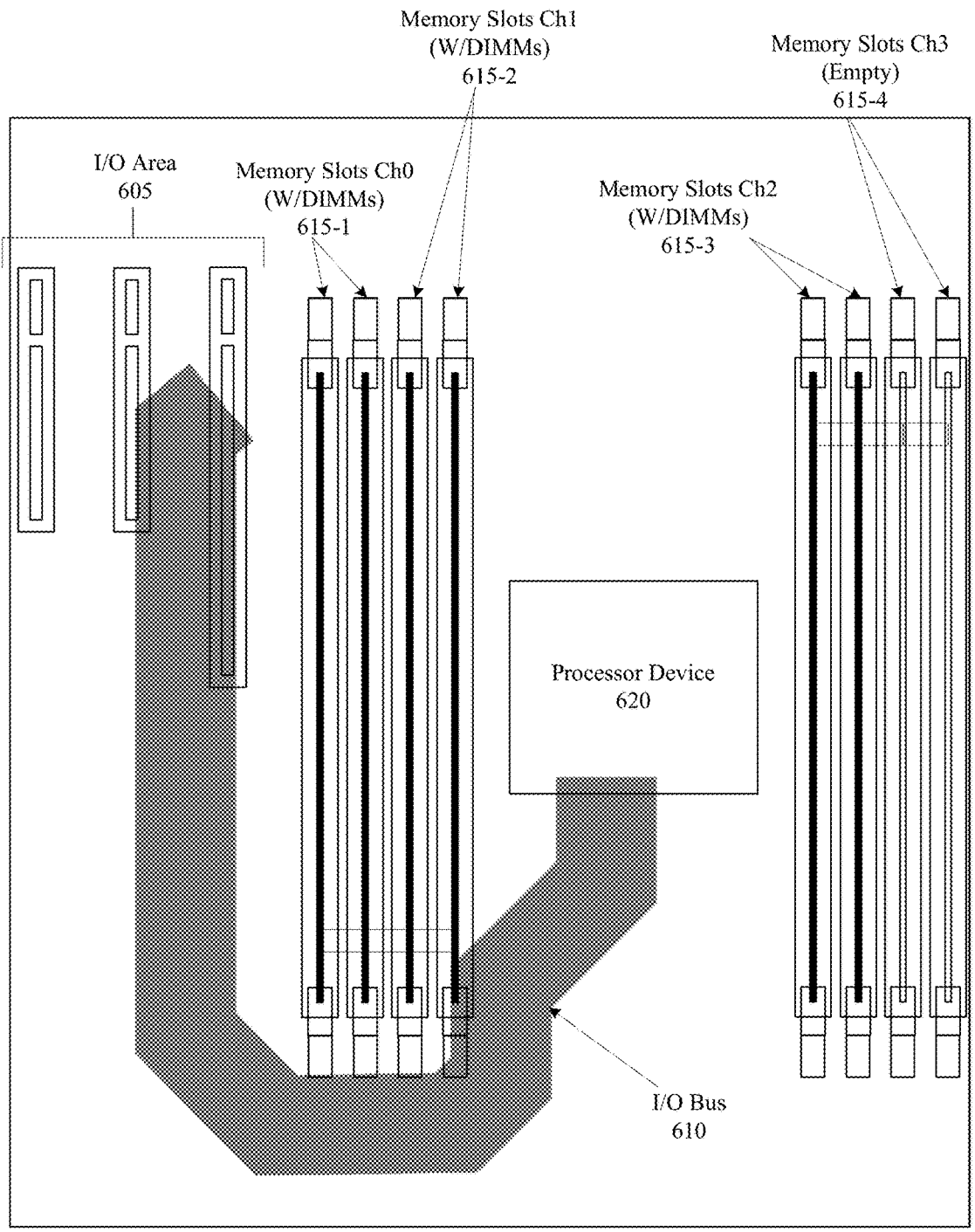
FIGS. 6A/6B illustrate examples of input/output (I/O) bus traces in a compute system.

FIGS. 6A/6B illustrate example I/O bus traces 610 in a compute system 600. FIG. 6A illustrates a typical bus trace 610 for systems that are not capable of dynamically configuring memory channels. In FIG. 6A, Ch3 is the disabled memory channel, and memory slots 615-1 through 615-3 are utilized. Thus, memory buses must be implemented in the layers of the circuit board of the compute system 600 to connect the memory slots 615-1 through 615-3 to the processor device 620. The I/O bus 610 is routed around the memory slots 615-1 and 615-2 due to the memory buses coupling the memory slots 615-1 and 615-2 to the processor device 620.

Figure 6B:
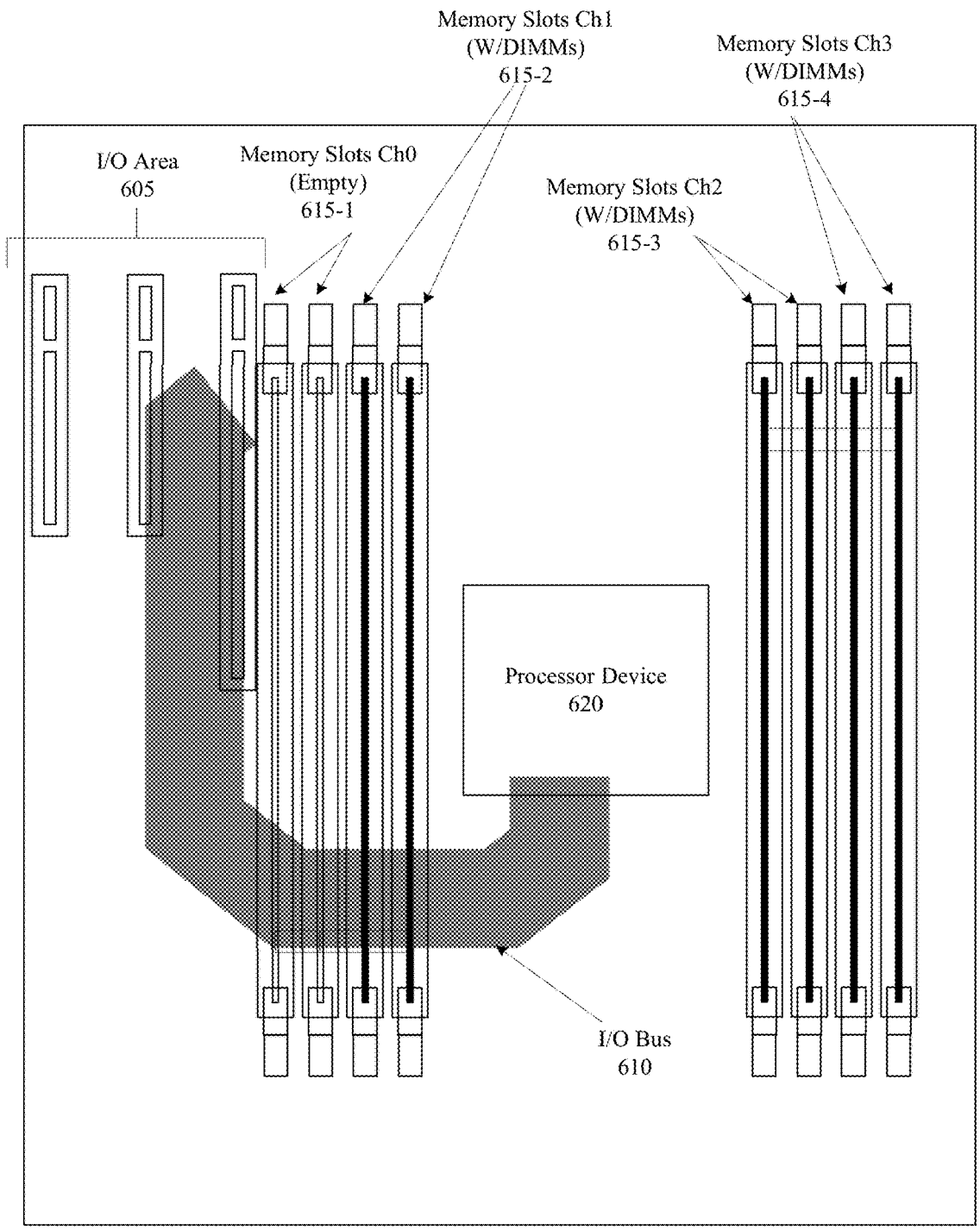

FIG. 6B illustrates an alternative example enabled by embodiments discussed herein where the memory slots 615-1 (Ch0) are not utilized, but the compute system 600 still includes three memory channels (Ch1, Ch2, and Ch3). In the illustrated example of FIG. 6B, the I/O bus trace 610 may be routed through the memory slots 615-1 area using the layer that typically would have the memory bus trace for the memory slots 615-1. Thus, FIG. 6B can have the same number of layers as the compute system 600 in FIG. 6A, but shorter I/O bus trace lengths.

Figure 7:
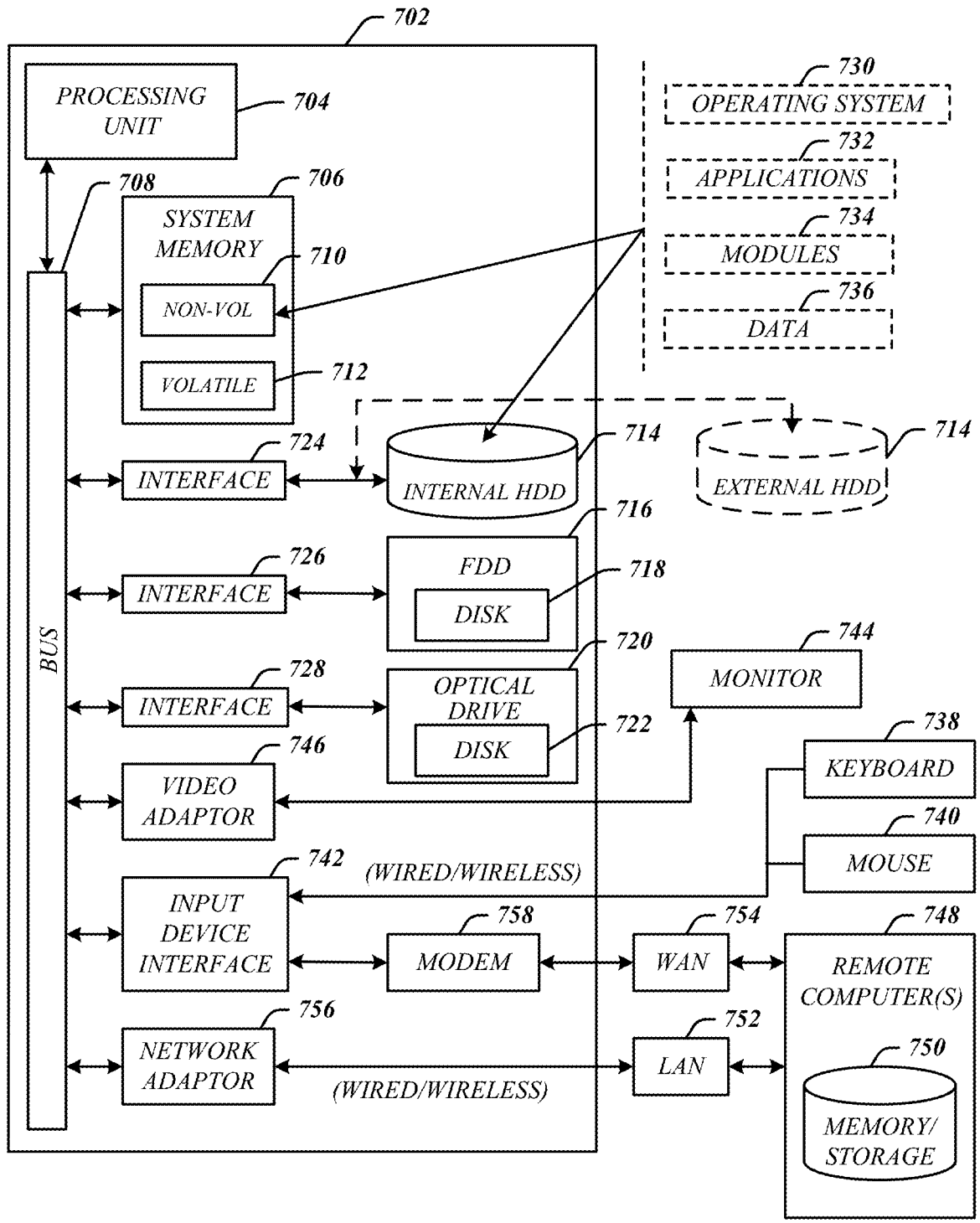
FIG. 7 illustrates an example of a compute system architecture.

FIG. 7 illustrates an embodiment of an exemplary computing architecture 700 suitable for implementing various embodiments as previously described. In one embodiment, the computing architecture 700 may include or be implemented as part of the compute system discussed herein.

As used in this application, the terms "system" and "component" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 includes a processing unit 704, a system memory 706 and a system bus 708. The processing unit 704 can be any of various commercially available processors.

The system bus 708 provides an interface for system components including, but not limited to, the system memory 706 and the processing unit 704. The system bus 708 can be any of several types of bus structure that may further interconnect to a memory bus (with or without a memory controller), a peripheral bus, and a local bus using any of a variety of commercially available bus architectures. Interface adapters may connect to the system bus 708 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 700 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 706 may include various types of computer-readable storage media in the form of one or more higher speed memory units, such as read-only memory (ROM), random-access memory (RAM), dynamic RAM (DRAM), double data rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as redundant array of independent disks (RAID) drives, solid state memory devices (e.g., USB memory), solid state drives (SSD) and any other type of storage media suitable for storing information. In the illustrated embodiment shown in FIG. 7, the system memory 706 can include non-volatile memory 710 and/or volatile memory 712. A basic input/output system (BIOS) can be stored in the non-volatile memory 710.

The computer 702 may include various types of computer-readable storage media in the form of one or more lower speed memory units, including an internal (or external) hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM or DVD). The HDD 714, FDD 716 and optical disk drive 720 can be connected to the system bus 708 by an HDD interface 724, an FDD interface 726 and an optical drive interface 727, respectively. The HDD interface 724 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736. In one embodiment, the one or more application programs 732, other program modules 734, and program data 736 can include, for example, the various applications and/or components of the system 700.

A user can enter commands and information into the computer 702 through one or more wire/wireless input devices, for example, a keyboard 738 and a pointing device, such as a mouse 740. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, track pads, sensors, styluses, and the like. These and other input devices are often connected to the processing unit 704 through an input device interface 742 that is coupled to the system bus 707, but can be connected by other interfaces such as a parallel port, IEEE 1394 serial port, a game port, a USB port, an IR interface, and so forth.

A monitor 744 or other type of display device is also connected to the system bus 708 via an interface, such as a video adaptor 746. The monitor 744 may be internal or external to the computer 702. In addition to the monitor 744, a computer typically includes other peripheral output devices, such as speakers, printers, and so forth.

The computer 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 702 family of standards, such as wireless devices operatively disposed in wireless communication (e.g., IEEE 702.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 702.11x (a, b, g, n, etc.) to provide secure, reliable, fast wireless connectivity. A Wi-Fi network can be used to connect computers to each other, to the Internet, and to wire networks (which use IEEE 702.3-related media and functions).

The various elements of the system 100 as previously described with reference to FIGS. 1-7 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate arrays (FPGA), memory units, logic gates, registers, semiconductor devices, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The detailed disclosure now turns to providing examples that pertain to further embodiments. Examples one through thirty-six (1-36) provided below are intended to be exemplary and non-limiting.

In a first example, a system, device, or apparatus may include a controller and memory storing instructions operable on the controller, the instructions, when executed, causing the controller to determine one or more memory channels of a plurality of memory channels to be enabled based on an indication received from a basic input/output system (BIOS). The controller also may determine whether a number of the one or more memory channels to be enabled is greater than a maximum number of memory channels permitted, cause a platform reset if the number of the one or more memory channels is greater than the maximum number of memory channels, and permit enablement of the one or more memory channels if the number of the one or more memory channels is not greater than the maximum number of memory channels.

In a second example and in furtherance of the first example, a system, device, or apparatus may include the controller to determine the maximum number of memory channels permitted based on information in a capability identification register.

In a third example and in furtherance of any previous example, a system, device, or apparatus may include the controller to process the indication comprising one or more bits, each of the one or more bits to indicate whether a corresponding memory channel of the plurality of memory channels is to be enabled or disabled.

In a fourth example and in furtherance of any previous example, a system, device, or apparatus may include the controller to set one or more bits in a shadow register based on the indication, the shadow register to prevent enablement changes to the plurality of memory channels during run-time of the system.

In a fifth example and in furtherance of any previous example, a system, device, or apparatus may include the controller to lock a memory channel register as read-only based on subsequent completion of a memory training boot phase to prevent enablement changes to the plurality of memory channels during run-time of the system.

In a sixth example and in furtherance of any previous example, a system, device, or apparatus may include the controller to enable the one or more channels during a boot process for the system.

In a seventh example and in furtherance of any previous example, a system, device, or apparatus may include the controller to prevent enablement changes to the plurality of memory channels during run-time of the system subsequent to a boot process.

In an eighth example and in furtherance of any previous example, a system, device, or apparatus may include the controller and the memory, the BIOS, and one or more memory modules including memory.

In a ninth example and in furtherance of any previous example, a computer-implemented method may include determining one or more memory channels of a plurality of memory channels to be enabled based on an indication received from a basic input/output system (BIOS), determining whether a number of the one or more memory channels to be enabled is less than or equal to a maximum number of memory channels permitted, causing a platform reset if the number of the one or more memory channels is greater than the maximum number of memory channels, and permitting enablement of the one or more memory channels if the number of the one or more memory channels is less than or equal to the maximum number of memory channels.

In a tenth example and in furtherance of any previous example, a computer-implemented method may include determining the maximum number of memory channels permitted based on information in a capability identification register.

In an eleventh example and in furtherance of any previous example, a computer-implemented method may include processing the indication comprising one or more bits, each of the one or more bits to indicate whether a corresponding memory channel of the plurality of memory channels is to be enabled or disabled.

In a twelfth example and in furtherance of any previous example, a computer-implemented method may include setting one or more bits in a shadow register based on the indication, the shadow register to prevent enablement changes to the plurality of memory channels during run-time of the system.

In a thirteenth example and in furtherance of any previous example, a computer-implemented method may include locking a memory channel register as read-only based on subsequent completion of a memory training boot phase to prevent enablement changes to the plurality of memory channels during run-time of the system.

In a fourteenth example and in furtherance of any previous example, a computer-implemented method may include enabling the one or more channels during a boot process for the system.

In a fifteenth example and in furtherance of any previous example, a computer-implemented method may include preventing enablement changes to the plurality of memory channels during run-time of the system subsequent to a boot process.

In a sixteenth example and in furtherance of any previous example, embodiments may include a non-transitory computer-readable storage medium, comprising a plurality of instructions, that when executed, enable processing circuitry to determine one or more memory channels of a plurality of memory channels to be enabled based on an indication received from a basic input/output system (BIOS) to determine whether a number of the one or more memory channels to be enabled is greater than a maximum number of memory channels permitted, cause a platform reset if the number of the one or more memory channels is greater than the maximum number of memory channels, and permit enablement of the one or more memory channels if the number of the one or more memory channels is not greater than the maximum number of memory channels.

In a seventeenth example and in furtherance of any previous example, embodiments may include a non-transitory computer-readable storage medium, comprising a plurality of instructions, that when executed, enable processing circuitry to determine the maximum number of memory channels permitted based on information in a capability identification register.

In an eighteenth example and in furtherance of any previous example, embodiments may include a non-transitory computer-readable storage medium, comprising a plurality of instructions, that when executed, enable processing circuitry to process the indication comprising one or more bits, each of the one or more bits to indicate whether a corresponding memory channel of the plurality of memory channels is to be enabled or disabled.

In a nineteenth example and in furtherance of any previous example, embodiments may include a non-transitory computer-readable storage medium, comprising a plurality of instructions, that when executed, enable processing circuitry to set one or more bits in a shadow register based on the indication, the shadow register to prevent enablement changes to the plurality of memory channels during run-time of the system.

In a twentieth example and in furtherance of any previous example, embodiments may include a non-transitory computer-readable storage medium, comprising a plurality of instructions, that when executed, enable processing circuitry to lock a memory channel register as read-only based on subsequent completion of a memory training boot phase to prevent enablement changes to the plurality of memory channels during run-time of the system.

In a twenty-first example and in furtherance of any previous example, embodiments may include a non-transitory computer-readable storage medium, comprising a plurality of instructions, that when executed, enable processing circuitry to enable the one or more channels during a boot process for the system.

In a twenty-second example and in furtherance of any previous example, embodiments may include a non-transitory computer-readable storage medium, comprising a plurality of instructions, that when executed, enable processing circuitry to the plurality of memory channels during run-time of the system subsequent to a boot process.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. Also, in the preceding Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are at this moment incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An apparatus, comprising:
a controller; and
memory storing instructions operable on the controller, the instructions, when executed, causing the controller to:
determine one or more memory channels of a plurality of memory channels to be enabled based on an indication received from a basic input/output system (BIOS);
determine whether a number of the one or more memory channels to be enabled is greater than a maximum number of memory channels permitted;
cause a platform reset if the number of the one or more memory channels is greater than the maximum number of memory channels; and
permit enablement of the one or more memory channels if the number of the one or more memory channels is not greater than the maximum number of memory channels.

2. The apparatus of claim 1, the controller to determine the maximum number of memory channels permitted based on information in a capability identification register.

3. The apparatus of claim 1, the indication comprising one or more bits, each of the one or more bits to indicate whether a corresponding memory channel of the plurality of memory channels is to be enabled or disabled.

4. The apparatus of claim 1, the controller to set one or more bits in a shadow register based on the indication, the shadow register to prevent enablement changes to the plurality of memory channels during run-time of the BIOS.

5. The apparatus of claim 1, the controller to lock a memory channel register as read-only based on subsequent completion of a memory training boot phase to prevent enablement changes to the plurality of memory channels during run-time of the BIOS.

6. The apparatus of claim 1, the controller to enable the one or more memory channels during a boot process for the BIOS.

7. The apparatus of claim 1, the controller to prevent enablement changes to the plurality of memory channels during run-time of the BIOS subsequent to a boot process.

8. The apparatus of claim 1, comprising:
a computer processor unit including the controller, the memory, and one or more processing cores coupled with the controller and the memory;
the BIOS; and
one or more memory modules including the memory.

9. A computer-implemented method, comprising:
determining one or more memory channels of a plurality of memory channels to be enabled based on an indication received from a basic input/output system (BIOS);
determining whether a number of the one or more memory channels to be enabled is less than or equal to a maximum number of memory channels permitted;
causing a platform reset if the number of the one or more memory channels is greater than the maximum number of memory channels; and
permitting enablement of the one or more memory channels if the number of the one or more memory channels is less than or equal to the maximum number of memory channels.

10. The computer-implemented method of claim 9, comprising determining the maximum number of memory channels permitted based on information in a capability identification register.

11. The computer-implemented method of claim 9, the indication comprising one or more bits, each of the one or more bits to indicate whether a corresponding memory channel of the plurality of memory channels is to be enabled or disabled.

12. The computer-implemented method of claim 9, comprising setting one or more bits in a shadow register based on the indication, the shadow register to prevent enablement changes to the plurality of memory channels during run-time of the BIOS.

13. The computer-implemented method of claim 9, comprising locking a memory channel register as read-only based on subsequent completion of a memory training boot phase to prevent enablement changes to the plurality of memory channels during run-time of the BIOS.

14. The computer-implemented method of claim 9, comprising enabling the one or more memory channels during a boot process for the BIOS.

15. The computer-implemented method of claim 9, comprising preventing enablement changes to the plurality of memory channels during run-time of the BIOS subsequent to a boot process.

16. A non-transitory computer-readable storage medium, comprising a plurality of instructions, that when executed, enable processing circuitry to:
determine one or more memory channels of a plurality of memory channels to be enabled based on an indication received from a basic input/output system (BIOS);
determine whether a number of the one or more memory channels to be enabled is greater than a maximum number of memory channels permitted;
cause a platform reset if the number of the one or more memory channels is greater than the maximum number of memory channels; and
permit enablement of the one or more memory channels if the number of the one or more memory channels is not greater than the maximum number of memory channels.

17. The non-transitory computer-readable storage medium of claim 16, comprising a plurality of instructions, that when executed, enable processing circuitry to determine the maximum number of memory channels permitted based on information in a capability identification register.

18. The non-transitory computer-readable storage medium of claim 16, the indication comprising one or more bits, each of the one or more bits to indicate whether a corresponding memory channel of the plurality of memory channels is to be enabled or disabled.

19. The non-transitory computer-readable storage medium of claim 16, comprising a plurality of instructions, that when executed, enable processing circuitry to set one or more bits in a shadow register based on the indication, the shadow register to prevent enablement changes to the plurality of memory channels during run-time of the BIOS.

20. The non-transitory computer-readable storage medium of claim 16, comprising a plurality of instructions, that when executed, enable processing circuitry to lock a memory channel register as read-only based on subsequent completion of a memory training boot phase to prevent enablement changes to the plurality of memory channels during run-time of the BIOS.

21. The non-transitory computer-readable storage medium of claim 16, comprising a plurality of instructions, that when executed, enable processing circuitry to enable the one or more memory channels during a boot process for the BIOS.

22. The non-transitory computer-readable storage medium of claim 16, comprising a plurality of instructions, that when executed, enable processing circuitry to prevent enablement changes to the plurality of memory channels during run-time of the BIOS subsequent to a boot process.

* * * * *